United States Patent [19]

Huang

[11] Patent Number: 5,974,520
[45] Date of Patent: Oct. 26, 1999

[54] COMPUTER ADDRESS TRANSLATION SYSTEM AND METHOD FOR CONVERTING EFFECTIVE OR LOGICAL ADDRESS TO PHYSICAL ADDRESS

[75] Inventor: Cheng-Yen Huang, Hsinchu, Taiwan

[73] Assignee: United Microelectronics Corp., Hsinchu, Taiwan

[21] Appl. No.: 08/941,088

[22] Filed: Sep. 30, 1997

[30] Foreign Application Priority Data

Aug. 13, 1997 [TW] Taiwan ................................. 86111595

[51] Int. Cl.[6] ............................. G06F 12/10; G06F 12/06
[52] U.S. Cl. ........................ 711/206; 711/208; 711/220; 711/203; 711/168
[58] Field of Search ..................................... 711/220, 206, 711/202, 118, 168, 208, 203

[56] References Cited

U.S. PATENT DOCUMENTS

| | | | |
|---|---|---|---|
| 5,233,553 | 8/1993 | Shak et al. ............................. | 708/491 |
| 5,255,377 | 10/1993 | Feldman ................................. | 711/202 |
| 5,517,657 | 5/1996 | Rodgers et al. ........................ | 711/169 |
| 5,652,872 | 7/1997 | Richter et al. .......................... | 395/500 |
| 5,664,159 | 9/1997 | Richter et al. .......................... | 395/500 |
| 5,701,448 | 12/1997 | White ..................................... | 395/580 |
| 5,860,154 | 1/1999 | Abramson et al. ..................... | 711/220 |

Primary Examiner—Eddie P. Chan
Assistant Examiner—Hong Kim
Attorney, Agent, or Firm—Rabin & Champagne, P.C.

[57] ABSTRACT

A computer address translation method and system applicable in CPUs for translating an effective address and a selector address into a physical address under the control of an invalidity signal through a translation lookaside buffer having a stored first address and a stored second address. An effective address and a selector address are simultaneously input to the translation lookaside buffer such that address translation and linear address production are parallel processed, thereby effectively speeding up the address translation process.

14 Claims, 3 Drawing Sheets

COMPUTER ADDRESS TRANSLATION SYSTEM AND METHOD FOR CONVERTING EFFECTIVE OR LOGICAL ADDRESS TO PHYSICAL ADDRESS

BACKGROUND OF THE INVENTION

1. Field of Invention

The present invention relates to computer architecture in an X-86 system such as a central processing unit (CPU) that can convert an effective address (EA) or logical address into a physical address (PA), and more particularly to a computer address translation system and the translating method.

2. Description of Related Art

Through the use of virtual memory, the X-86 type of computer architecture is now capable of achieving exceptionally high reading and writing speed. Therefore, virtual memory has become an indispensable part of the computer system. However, the address in a virtual memory is implicitly or explicitly programmed by the user into a word referred to as the effective address, hence the effective address must be translated and mapped into a physical address in an actual memory unit to make the virtual memory system compatible. In general, the amount of mappings in translating from effective address to physical address can be very large. To speed up the translating process, address translation is executed using a high-speed memory unit within the CPU. The high-speed memory unit is known as a translation lookaside buffer (TLB). TLB is a special cache memory for address translation whose input is the effective address and the output is the physical address. Generation of the physical address is largely determined by the result of comparing the linear address (LA) to a tag memory residing within the TLB. The tag memory is a content addressable memory (CAM).

FIG. 1 is a block diagram of a conventional computer address translation system. As shown in FIG. 1, first a 32-bit effect address EA is computed by passing through an effective address computational device 10. For example, the base address, offset address and the index address are summed together to obtain an effective address EA within the effective address computational device 10. Next, a selector address SA is input to a segment descriptor cache memory 11, and a 32-bit segment base address Base is output from it. Subsequently, the 32-bit segment base address and the effective address EA are added together to obtain a 32-bit linear address LA. The physical address PA can be determined only after the linear address LA has gone through the inquiries inside a translation lookaside buffer (TLB) 12. For example, the 0–11 bits of the linear address is a segment address, and the 12–bits of the linear address is page address. The page address is input to a tag memory 13 within the translation lookaside buffer (TLB) 12, and then compared with the linear address LA' there. If there is a hit that corresponds to the page base (PB) of the physical address stored in a data memory 14, the 20-bit physical page address is output and then combined with the original 12-bit segment address to form a physical address PA. The data memory 14 also resides within the translation lookaside buffer (TLB) 12 and can be a random access memory (RAM), for example. In other words, a linear address can be obtained only after an effective address is produced, and a physical address can be obtained only after the linear address is released, and hence much processing time is wasted. Because the address stored inside the linear address LA' of the tag memory 13 within the translation lookaside buffer (TLB) 12 is access serially, such processing will generate a critical path, and create a bottleneck in high speed electronic circuit designs.

In light of the foregoing, there is a need in the art for reducing the bottleneck in a conventional computer address translation system.

SUMMARY OF THE INVENTION

Accordingly, the present invention is directed to provide a parallel processing address translation system and method that can avoid the creation of a bottleneck in the conventional high speed design because the physical address must be generated serially by putting the linear address into a translation lookaside buffer.

To achieve these and other advantages and in accordance with the purpose of the invention, as embodied and broadly described herein, the invention provides a computer address translation method applicable in CPUs for translating an effective address into a physical address using a translation lookaside buffer that includes a stored first address and a second address. The method comprises the steps of generating a 32-bit effective address and a 4-bit selector address; then, outputting the selector address to a segment descriptor cache memory to generate a 32-bit base address; next, adding the effective address and the base address through an adder to generate a 32-bit linear address and a carry signal; thereafter, combining the 20 high-bits of the effective address with the carry signal to obtain a 20-bit compared effective address; subsequently, translating the selector address, a segment descriptor cache memory modified signal and an invalidity request signal into an invalidity signal; under the control of the invalidity signal, comparing the compared effective address, the selector address with the first and the second addresses to determine whether a 20 high-bits physical address can be output; then, extracting the 12 low-bits of the linear address to obtain a low-bits physical address; finally, combining the high-bits physical address with the low-bits physical address to form the full physical address.

In another aspect, the invention provides a computer address translation system applicable in CPUs for translating an effective address into a physical address using a translation lookaside buffer that includes a stored first address and a second address. The system comprises a segment descriptor cache memory, an adder, an incrementor, a translation lookup invalidity controller, a translation lookaside buffer and a wire connector. The segment descriptor cache memory is used for receiving a selector address and generating a base address. The adder is used for receiving the base address and the effective address and outputting a linear address and a carry signal. The incrementor is used for receiving the carry signal and the 20 high-bits of the effective address and outputting a compared effective address. The translation lookup invalidity controller is used for receiving a segment descriptor cache memory modified signal, an invalidity request signal and the selector address, and then sending out an invalidity signal. The translation lookaside buffer is used for receiving compared effective address, the selector address, the invalidity signal and compared with the first and the second addresses to determine whether a match is found, and then outputting the 20 high-bits physical address accordingly. The wire connector is for receiving the 12 low-bits of the linear address and the 20 high-bits of the physical address to form the physical address.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Figure 1:
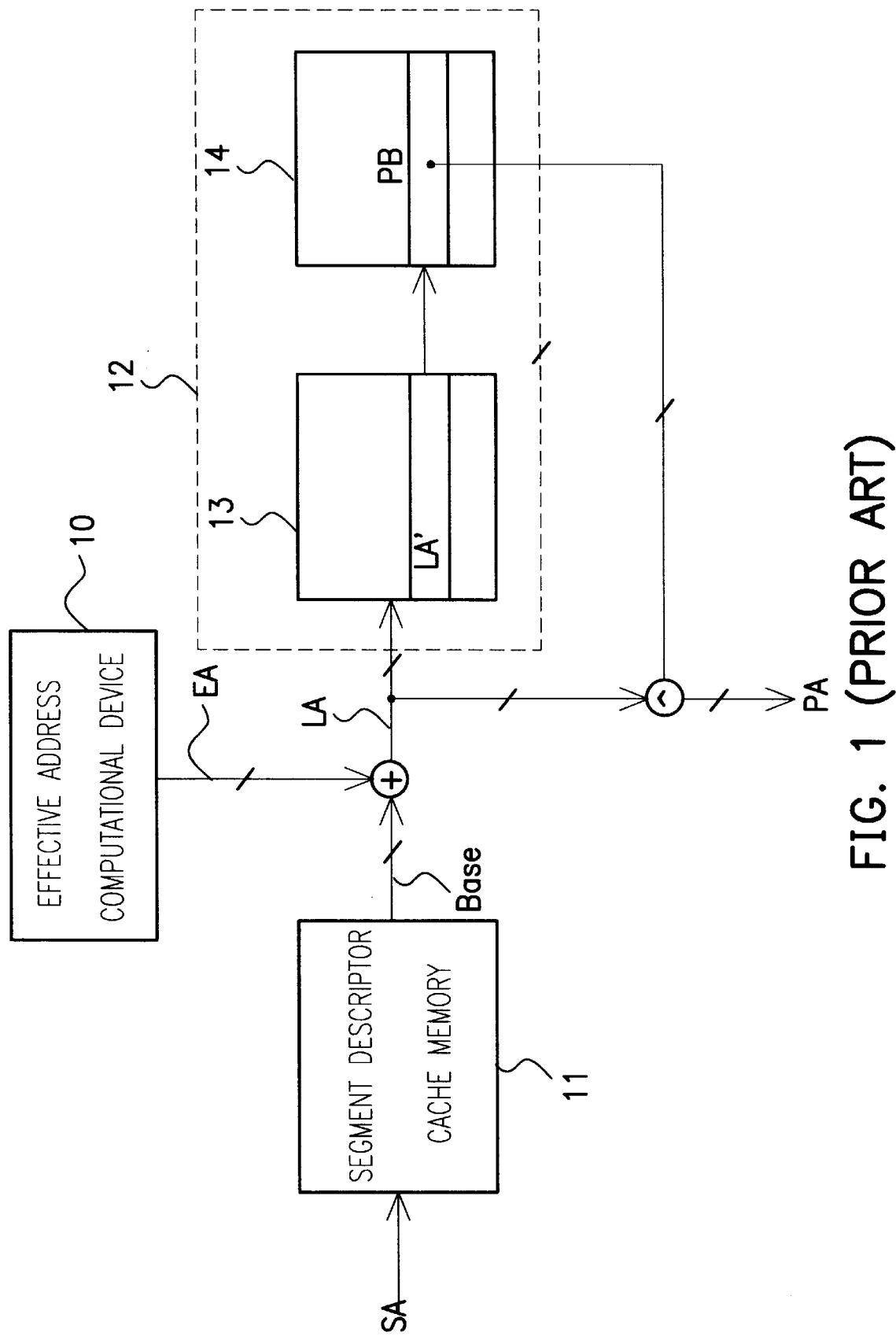
FIG. 1 is a block diagram of a conventional computer address translation system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
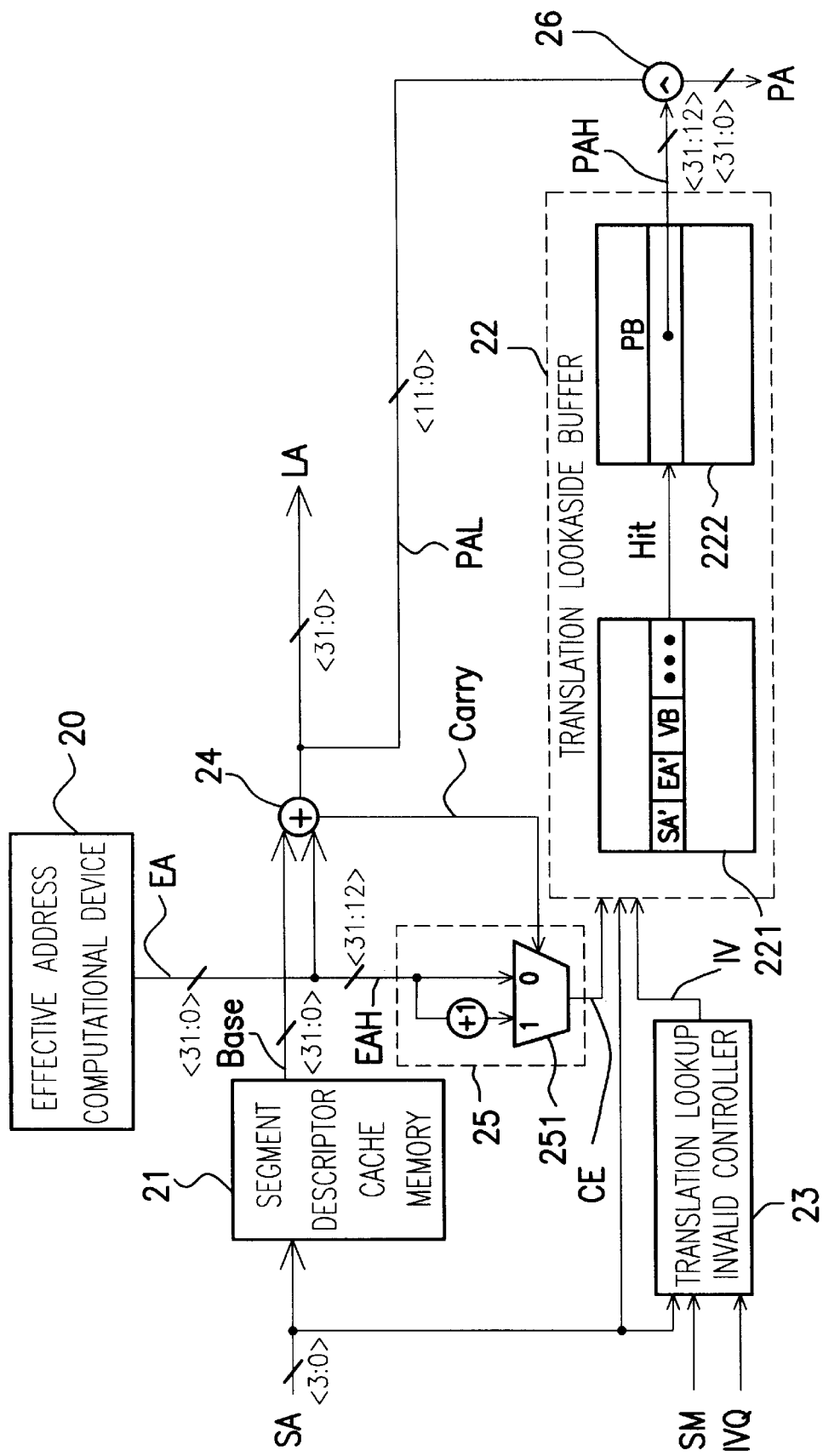
FIG. 2 is a block diagram of a computer address translation system according to one preferred embodiment of this invention.

FIG. 2 is a block diagram of a computer address translation system according to one preferred embodiment of this invention. As shown in FIG. 2, through the computation performed by an effective address computational device 20, a 32-bit effective address is obtained. The effective address can be generated, for example, by adding together the base address, the offset address or the index address inside the effective address computational device 20. Then, a 4-bit selector address SA coming from a micro-code is input to a segment descriptor cache memory 21, a translation lookaside buffer 22 and an translation lookup invalidity controller (hereinafter "invalidity controller") 23. Thereafter, a 32-bit segment base address Base is output from the segment descriptor cache memory 21. The segment base address Base can be, for example, a multiplexer having 16 registers that can each hold a 32-bit segment base address Base. Subsequently, the effective address EA and the base address Base are added together by an adder 24 to obtain a 32-bit linear address LA. The first 12 bits (bits 0–11) are the low-bits of the physical address PAL.

Simultaneously, the high-bits (12–31) effective address EAH, which is also the page address contained in the effective address EA, is input to an incrementor 25. The incrementor includes a multiplexer 251 and some circuit structures. The low-bits (0–11) of the effective address EA and the low-bits (0–11) of the base address Base are added together with the adder 24, and then send out a carry signal to the multiplexer 251 of the incrementor 25 for computing a compared effective address CE.

The selector address SA, a segment descriptor cache memory modified signal SM and an invalidity address signal IVQ are input to a translation lookup invalidity controller 23, and then an invalid signal IV is sent to the translation lookaside buffer 22.

The translation lookaside buffer 22 receives the selector address SA, the compared effective address CE and the invalidity signal IV, for subsequent comparison. The translation lookaside buffer 22 includes a tag memory 221 and a data memory 222 whose functions are as follows: The tag memory 221 is a type of content addressable memory for storing a pre-assigned address including a selector address SA', an effective address EA' and a valid bit VB, for example, generated by the execution of a previous calculation. The tag memory 221 receives a selector address SA and a compared effective address CE, and then compares these address with the corresponding stored addresses internally to determine if there is a match. When there is a match and the valid bit VB is valid (VB=1), a hit signal is sent out to the data memory 222. The data memory 222 is a random access memory (RAM) for storing a 20-bit page base address PB. When a hit signal is received from the tag memory 221, the page base address PB is sent out as a high-bit (12–31) physical address PAH. When the input compared effective address CE is different from the effective address EA' stored in the tag memory 221, or when the input selector address SA is different from the stored selector address SA' in the tag memory 221, or when the valid bit VB residing in the tag memory 221 is invalid (VB=0), no hit signal will be sent to the data memory 222. Instead, an error signal will be sent to the CPU to refresh the tag memory 221 and the data memory 222 and obtain a correct address.

Finally, the low-bits of the physical address PAL are combined with the high-bits of the physical address, PAH to form the full physical address through a wire connector 26.

In this system, if the data in the segment descriptor cache memory 21 is modified, a segment descriptor cache memory modified signal SM and an invalidity request signal IVQ will be generated simultaneously and sent to the translation lookup invalid controller 23. Then, the translation lookup invalidity controller 23 will enable the invalidity signal IV so that the common parts between the selector address SA' residing in the tag memory 221 and the selector address SA coming from micro-code are disabled. The above method uses a comparator for comparing the two selector addresses SA and SA'. Therefore, when the two selector addresses SA and SA' are the same, an invalidity signal IV must be generated by the translation lookup invalidity controller 23 and sent to the translation lookaside buffer 22 to disable the comparison, thus avoiding the transfer of an incorrect address from the translation lookaside buffer 22.

Figure 3:
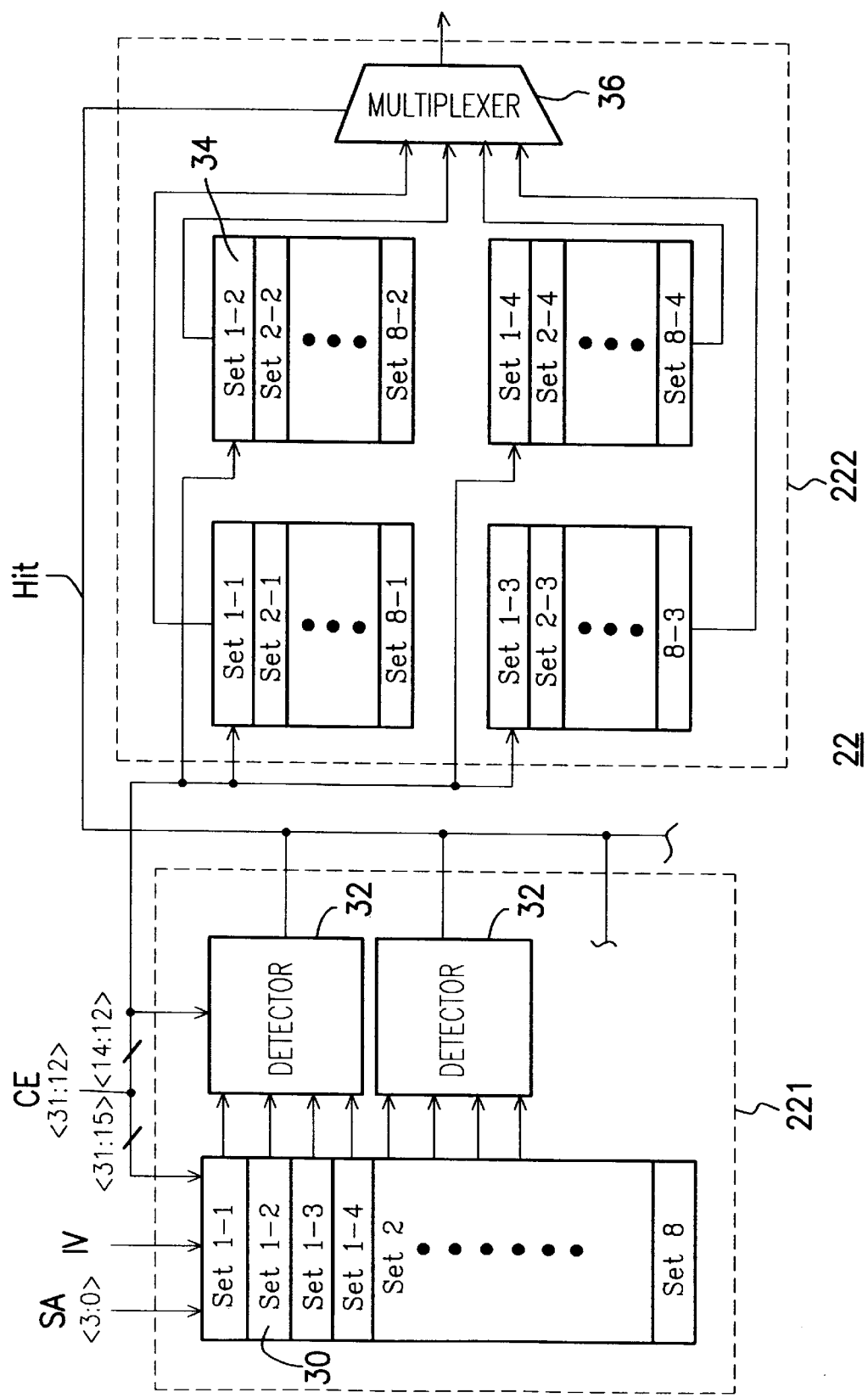
FIG. 3 is a block diagram showing the memory transfer of a translation lookaside buffer as shown in FIG. 2.

FIG. 3 is a block diagram showing the memory transfer of a translation lookaside buffer as shown in FIG. 2. As shown in FIG. 3, the left block which is enclosed by dash lines designates the tag memory 221, and the right block which is also enclosed by dashed lines is the data memory 222. As mentioned before, the translation lookaside buffer 22 receives a compared effective address CE, a selector address SA and an invalid signal IV. For 32-bit memory, the tag memory 221 and the data memory 222 can have, for example, eight memory segments Set 1 to Set 8, and each memory segment can have, for example, four memory sub-segments Set 1-1 to Set 1-4. The address storage space in a tag memory 221 preferably includes a selector address SA', an effective address EA and a valid bit VB. For example, one of the address storage spaces is shown as a memory sub-segment 30 in the tag memory 221 and a memory sub-segment 34 in data memory 222. For a tag memory 221 having eight memory segments Set 1 to Set 8, it further includes eight detectors 32 for detecting any abnormal circumstances in the memory sub-segments Set 1-1 to Set 8-4. Three bits of the compared effective address input (bits 12–14) are used to pick up one of the eight memory segments Set 1 to Set 8. For example, when all three bits are 0, memory segment Set 1 of the tag memory 221 will be selected for transferring data to the detector 32. Subsequently, any abnormality in the memory sub-segments has to be checked by the detector 32, for example, only one of the four memory sub-segments Set 1-1 to Set 1-4 can generate a hit signal. Also, when the three bits (12–14) of the compared effective address CE are all 0, these three bits will be sent to the data memory 222 corresponding to one of the memory sub-segments Set 1-1 to Set 1-4 where a page address PB is stored. Finally, a 4-to-1 multiplexer 36 in the data memory 222 is used to receive the hit signal generated by the aforementioned detector 32 and output the correct address. Thus, the address translation function is served.

Therefore, the main characteristic of this invention is the simultaneous input of an effective address and a selector address to the translation lookaside buffer such that address translation and linear address production are parallel processed, thereby effectively speeding up the address translation process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer address translation method applicable in CPUs for translating an effective address into physical address using a translation lookaside buffer having a stored first address and a stored second address, comprising the steps of:

(a) generating the effective address and a selector address;
    (b) inputting the selector address into a segment descriptor cache memory for generating a base address;
    (c) adding the effective address and the base address to obtain a linear address and a carry signal;
    (d) computing a compared effective address using high-bit portions of the effective address and the carry signal;
    (e) translating the selector address, a segment descriptor cache memory modified signal and an invalidity request signal into an invalidity signal;
    (f) comparing the compared effective address and the selector address with the first address and the second address under the control of the invalidity signal;
    (g) outputting a high-bits physical address from the translation lookaside buffer, if said step (f) results in a notch;
    (h) extracting the low-bits portions of the linear address to obtain low-bits physical address; and
    (i) combining the high-bits physical address and the low-bits physical address to obtain the physical address.

2. The method of claim 1, wherein the first address includes space for holding a pre-assigned effective address, a pre-assigned selector address and a valid bit.

3. The method of claim 1, wherein the selector address is a 4-bit address and the effective address, the base address, the linear address are 32-bit addresses.

4. The method of claim 3, wherein the high-bits of the effective address are the 20 high-bits of the effective address.

5. The method of claim 3, wherein the high-bits of the physical address are the 20 highest bits of the physical address, and the low-bits of the physical address are the 12 lowest bits of the physical address.

6. The method of claim 1, further comprising after step (f) and before step (g), a step (f1) when the result of the comparison is a match, as follows:

(f1) outputting the second address.

7. The method of claim 1, further comprising after step (f) and before step (g), steps (f2) and (f3) when the result of the comparison is a mismatch, as follows:

(f2) renewing the first address and the second address; and
    (f3) repeating step (f) again.

8. The method of claim 1, further comprising after step (f) and before step (g), steps (f4) through (f6) when the selector address is renewed, as follows:

(f4) enabling the invalidity signal to invalidate the selector address;
    (f5) renewing the first address and the second address; and
    (f6) repeating step (f) again.

9. A computer address translation system applicable in CPUs for translating an effective address into a physical address using a translation lookaside buffer having a stored first address and a stored second address, comprising:

a segment descriptor cache memory for receiving a selector address and generating a base address;
    an adder for receiving the base address and the effective address and outputting a linear address and a carry signal;
    an incrementer for receiving the carry signal and high bits of the effective address and outputting a compared effective address;
    a translation invalidity controller for receiving a segment descriptor cache memory modified signal, an invalidity request signal and the selector address and outputting an invalidity signal;
    a translation lookaside buffer for receiving the compared effective address, the selector address and the invalidity signal, to determine after a comparison whether there is a match with the first and the second address, and then outputting a high-bits physical address; and
    a wire connector for receiving the low bits of the linear address and the high bits of the physical address and outputting the physical address.

10. The system of claim 9, wherein the translation lookaside buffer further includes:

a tag memory for storing the first address and later for comparing the first address with the compared effective address and the selector address to determine if a hit signal should be output; and
    a data memory for storing the second address and outputting the high-bits physical address after receiving the hit signal.

11. The system of claim 9, wherein the first address includes a pre-assigned effective address, a pre-assigned selector address and a valid bit.

12. The system of claim 9, wherein the selector address is a 4-bit address, and the effective address, the base address, the linear address are 32-bit addresses.

13. The system of claim 12, wherein the high-bits of the effective address are the 20 highest bits of the effective address.

14. The system of claim 12, wherein the high-bits of the physical address are the 20 highest bits of the physical address, and the low-bits of the physical address are the 12 lowest bits of the physical address.

* * * * *